May 6, 1969  S. P. STRÖMBERG  3,442,418
FISH BOX MADE FROM PLASTIC MATERIAL
Filed Nov. 18, 1966
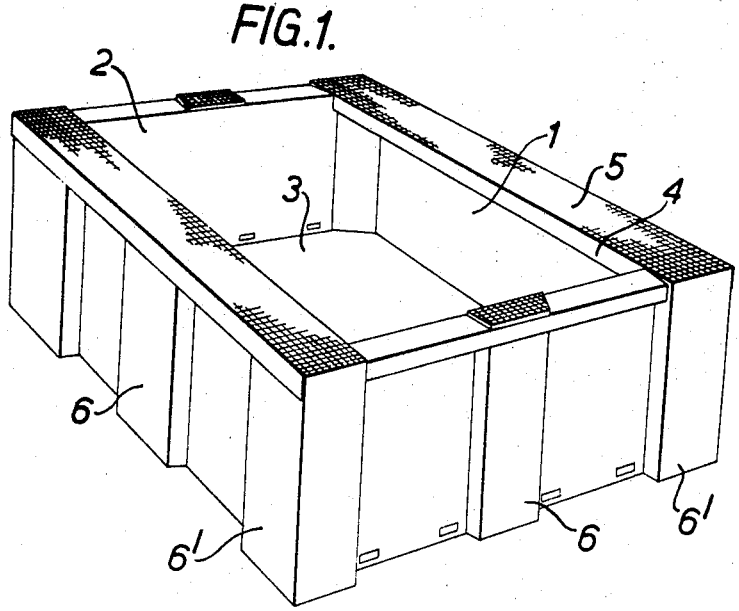
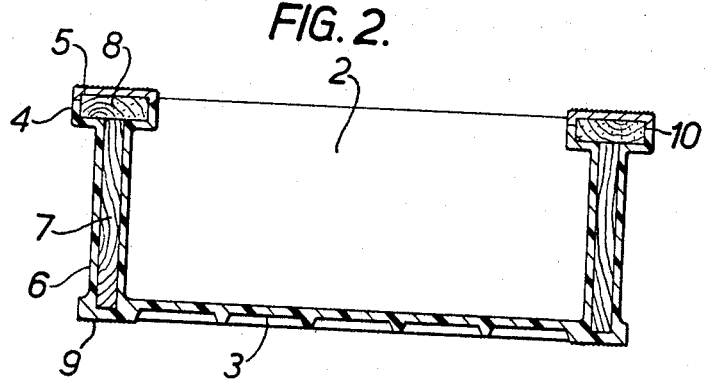
INVENTOR
Svein Petro Strömberg
By Davis, Hoxie, Faithfull & Hapgood
Attorneys May 6, 1969 S. P. STRÖMBERG 3,442,418
FISH BOX MADE FROM PLASTIC MATERIAL
Filed Nov. 18, 1966 Sheet 2 of 2
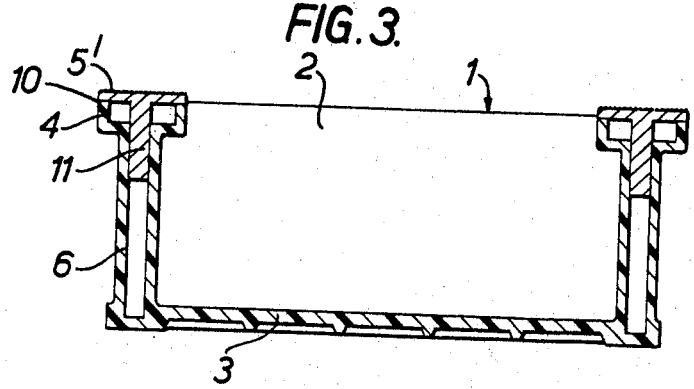
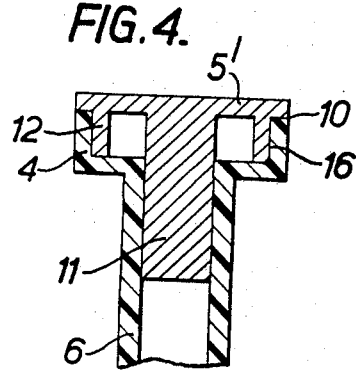
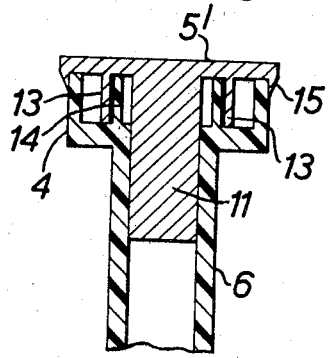
INVENTOR
Svein Petro Strömberg
By Davis, Hoxie, Faithfull & Hapgood
Attorneys

United States Patent Office 3,442,418
Patented May 6, 1969

3,442,418
FISH BOX MADE FROM PLASTIC MATERIAL
Svein Petro Strömberg, Strommen, Norway, assignor to Svein Stromberg & Co. A/S
Filed Nov. 18, 1966, Ser. No. 595,515
Claims priority, application Norway, Nov. 20, 1965, 160,570; Oct. 4, 1966, 165,001
Int. Cl. B65d 7/42
U.S. Cl. 220—71      5 Claims

ABSTRACT OF THE DISCLOSURE

A plastic box suitable for storage and handling of fish is provided with reinforcement members to reduce the quantity of plastic required for an adequately strong box. Drain apertures and surface ribs are provided to allow for drainage and air circulation for cooling the fish. Slip resistant surfaces are provided to permit secure stacking. A top frame is frictionally fitted to the top of the side walls.

In recent years a series of proposals have been made as to transport and storing boxes made from plastic material. For transport and storing of fish, such boxes must satisfy certain requirements. Preferably they have to be light in weight, so that they are easy to handle. At the same time the boxes must be sturdy so that they can be stacked high when filled with fish and can endure workers standing on the boxes during stacking and working with the fish load. These two demands of strength and lightness in a certain degree counteract each other.

Previously boxes of wood were used. Such wooden boxes had the necessary strength, but they were heavy and were easily damaged. Boxes of plastic material can without difficulties be given the necessary strength, but they are relatively expensive as an excessive great amount of plastic material is necessary for the reinforcements.

The invention has for its objects to provide a fish box which satisfies the demand as to lightness as well as strength, at the same time as one obtains a box which can be produced at relatively low costs.

The fish box according to the invention is characterized by that in its walls are incorporated vertically extending channel-formed cavities, in which entirely or partly are inserted reinforcing elements made from a convenient rigid material, the walls of said channels at their ends being connected with channel-formed reinforcement parts arranged along the upper and lower edges of the box, which parts by connection with said vertically extending channels form a rigid frame work.

By building up a fish box as above stated, the box body itself may be produced with relatively thin walls, due to the fact that the box is provided with a skeleton constituted by the interconnected channels and their reinforcements which can take up the load.

The bottom as well as the top reinforced edges are preferably provided with flutes, grooves or the like to provide good friction for the stacking of boxes on the top of each other for preventing skidding when workers stand on the boxes, for instance in the hold of a ship which is rolling.

The boxes preferably are given such dimensioning of the side protrusions or element channels that convenient air circulation passages are formed between the boxes when they are stacked side by side. Thereby the cooling of the fish in the box is made better. The boxes are also provided with drain apertures.

The invention will be better understood from the following description of the embodiments shown as examples in the drawings.

FIGURE 1 shows an example of a fish box according to the invention seen in perspective; and
FIGURE 2 shows box according to FIGURE 1 seen in cross-section;
FIGURE 3 shows a cross-section through a modified embodiment of the box; and
FIGURES 4 and 5 show on a larger scale modified details.

The boxes according to the examples disclosed are parallelepipedal and thus comprise side walls 1, and walls 2 and a bottom 3 which parts are as a unit made from plastic material.

The side walls 1 are provided with vertically extending channels. In the example shown there is arranged one such channel 6 at the middle of each wall and one channel 6' in each corner. It will, however, be understood that another number of channels may be chosen according to the strength which is desired for the box.

Along the upper and lower side edges there are arranged reinforced edge parts. The upper edges have the form of channels 4 in which are inserted stiffening elements 8. In the example shown in FIGURE 2 the stiffening elements 8 as well as the reinforcing elements 7 in the vertical channels 6, 6' are made from wood. Also other rigid material of course can be used. The elements 7 and 8 are placed in the channels in the finished boxes, whereupon the channels are sealed at the top by means of a lid frame 5 which is secured to the box by means of a welding seam along the joint 10.

To eliminate such welded joint between the box and the frame-like lid 5, it is proposed according to a modification shown in FIGURES 3–5 that said lid 5' is provided with tenons 11 protruding entirely or partly down in the channels 6. Between the tenons 11 and the inner wall surfaces of the channels there is obtained an effective force fit, sufficient to keep the two parts of the box effectively locked together. Welding the seam in the joint 10 between the lid frame 5' and the edge of the upper channel-formed part 4 thus may be unnecessary.

According to the embodiment shown in FIGURE 4 the lid frame 5' is provided with downwardly extending ribs 12 to provide a further stiffening of the longitudinal edges 4 of the box.

In the embodiment according to FIGURE 4 the ribs 12 are so adapted that they rest against the inner surface of the channel 4 with a force fit. The engagement surfaces 16 between said parts thus will effectively contribute to keep the two parts of the box together. The tenons 11 thus may be omitted. Eventually the surfaces 16 which are in engagement can be provided with grooves or in another way be so formed that an enhanced locking is obtained between the parts 5' and 4.

In FIGURE 5 is shown an embodiment where the lid 5' is provided with ribs 13. Ribs may also be arranged extending from the bottom of the channel 4 up against the lower surface of the lid. This is indicated at 14 in the drawing. Also the ribs 13 and 14 may co-operate for the securing of the lid 5' to the edge of the box so that the tenon 11 in case may be omitted. Such tenons will, however, give an effective centering and reinforcement of the structure, and therefore usually it is convenient to maintain such tenons inserted in the vertical channels.

In the example shown in FIGURE 5 the lid 5' is provided with a small downwardly extending rib 15 engaging on the outer side of the upper part of the channel 4 to give a further effective locking of the parts together.

I claim:
1. An open plastic box, suitable for storage and transport of fish, having integral side walls and a bottom, said side walls having protuberant vertically extending cavities into which can be inserted reinforcing elements of rigid material, the upper extremity of said side walls being in the form of a horizontal rectangular channel having a trough open at the top, the trough of said channel being in open communication with said vertically extending cavities, the trough of said horizontal upper channel being closed by a rectangular frame provided with downwardly extending elements adapted to be received within the vertically extending cavities to be retained therein by a friction fit.

2. A box according to claim 1 wherein the rectangular frame is further provided with downwardly extending reinforcing ribs positioned to be enclosed within the trough of the horizontal upper channel.

3. A box according to claim 2 wherein the reinforcing ribs are positioned on the frame so as to coextend with the inner vertical surfaces of the horizontal channel and are adapted to friction fit therewith.

4. A box according to claim 2 wherein the horizontal channel is provided with upwardly extending reinforcing ribs.

5. A box according to claim 3 wherein the horizontal channel is provided with upwardly extending reinforcing ribs positioned to coextend and frictionally engage with the downwardly extending ribs of the frame.

References Cited

UNITED STATES PATENTS

| | | | |
|---|---|---|---|
| 616,246 | 12/1898 | Milligan. | |
| 775,894 | 11/1904 | Chidister | 220—71 |
| 1,642,643 | 9/1927 | Carruth | 150—51 |
| 2,676,729 | 4/1954 | Neville et al. | 220—71 |

JOSEPH R. LECLAIR, *Primary Examiner.*

J. R. GARRETT, *Assistant Examiner.*

U.S. Cl. X.R.

220—73